(12) United States Patent
Martinez et al.

(10) Patent No.: US 12,524,582 B1
(45) Date of Patent: Jan. 13, 2026

(54) SYSTEMS AND METHODS FOR SANDBAG DEPLOYMENT

(71) Applicant: UIPCO, LLC, San Antonio, TX (US)

(72) Inventors: Noe Alberto Martinez, San Antonio, TX (US); Megan Sarah Jennings, San Antonio, TX (US); Christopher Russell, The Colony, TX (US); Justin Royell Nash, Little Elm, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1023 days.

(21) Appl. No.: 17/586,975

(22) Filed: Jan. 28, 2022

Related U.S. Application Data

(60) Provisional application No. 63/143,412, filed on Jan. 29, 2021.

(51) Int. Cl.
*G06F 30/13* (2020.01)
*H04B 5/77* (2024.01)

(52) U.S. Cl.
CPC .............. *G06F 30/13* (2020.01); *H04B 5/77* (2024.01)

(58) Field of Classification Search
CPC .... G06F 3/011; G06F 3/0346; G06F 3/04815; G06F 3/016; G06F 1/163; G06F 3/012; G06F 3/017; G06F 3/0304
See application file for complete search history.

(56) References Cited

U.S. PATENT DOCUMENTS

| | | | | |
|---|---|---|---|---|
| 10,579,749 | B1* | 3/2020 | Davis | G06F 30/20 |
| 11,357,668 | B2* | 6/2022 | Omori | A61F 13/42 |
| 11,663,550 | B1* | 5/2023 | Marotta | G06K 7/1413 |
| | | | | 705/26.8 |
| 2019/0004618 | A1* | 1/2019 | Tadros | G06F 3/012 |
| 2019/0318440 | A1* | 10/2019 | Wani | G06Q 50/265 |

* cited by examiner

*Primary Examiner* — Rehana Perveen
*Assistant Examiner* — John David Hagler
(74) *Attorney, Agent, or Firm* — Plumsea Law Group, LLC

(57) ABSTRACT

A system and method for implementing the deployment of sandbags so as to mitigate any damages when flooding is forecast. The system may use local weather information, local topographical information and current flooding conditions to produce a virtual map showing suggested sandbag deployment to mitigate flood damage. Such a virtual map is interactively displayed in a virtual home environment. The user interacts with the virtual home environment via an avatar. RFID tags, or any other suitable near field identification technology, are placed inside the sand bags such that the actual locations of the sandbags can be compared to the suggested deployment.

20 Claims, 12 Drawing Sheets

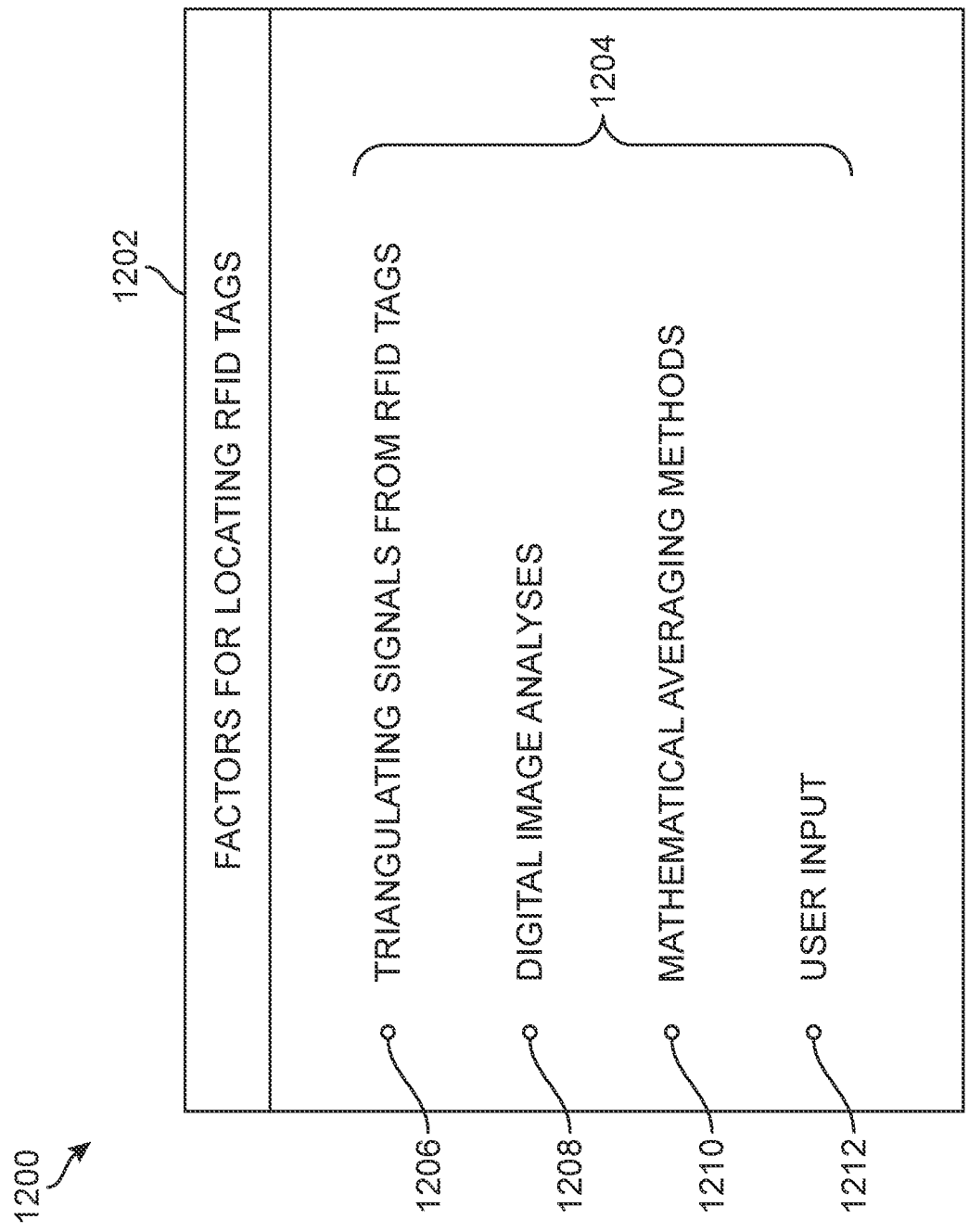

SYSTEMS AND METHODS FOR SANDBAG DEPLOYMENT

This application claims the benefit of Provisional Patent Application No. 63/143,412, filed Jan. 29, 2021, and titled "Systems and Methods for Sandbag Deployment," which is incorporated by reference herein in its entirety.

TECHNICAL FIELD

This disclosure relates to systems and methods that use virtual reality technologies to implement the deployment of sandbags to best mitigate damage due to flooding.

BACKGROUND

In the event of a forecasted possibly dangerous event that may cause widespread damage due to floods, such as a hurricane and/or overflowing rivers, the owners of homes, commercial buildings or other structures, or the managers of institutions (such as universities, schools or hospitals) have limited times during which they may take preventative measures to mitigate the damages that may be caused by the flooding. In many cases, they may decide to deploy sandbags around their homes, commercial buildings, or other structures in order to mitigate potential flood damage. As a general rule, deploying sandbags around buildings for flood mitigation is laborious and time-consuming. It usually needs to be accomplished in a relatively short time frame, often by persons who do not have special knowledge or expertise in how to most effectively deploy the sandbags. Also, it depends on up-to-date knowledge of likely weather and the extent of any possible flooding conditions. Moreover, the forecasts, as well as the weather conditions themselves, can change rapidly in the event of extreme weather.

For these reasons, there is a need for systems and methods that may be used to improve the deployment of sandbags in order to mitigate the damaging effects of flooding.

SUMMARY

In another aspect, embodiments include a system for mitigating damage due to flooding that has a virtual home application installed in a computing device and a flood simulator application installed in the computing device that is communication with the virtual home application. The virtual home application has a virtual map of a structure and of the topography of terrain adjoining the structure. The virtual home application is configured to display the structure on a screen of the computing device and to show an avatar walking within the structure and around the structure as directed by a user. The flood simulator application is configured to receive forecasts related to flooding and to evaluate the extent of flooding around the structure based upon the forecasts related to flooding. The flood simulator application is also configured to suggest placement of sandbags at suggested locations so as to mitigate damage due to the flooding by displaying images of the sandbags at their suggested locations in the virtual map on a screen of the computing device.

In yet another aspect, embodiments include a method for mitigating damage due to flooding that activates a virtual home application and a flood simulator application, wherein the virtual home application comprises a map of a structure and of terrain adjoining the structure. It also includes receiving forecasts of flooding events around the structure and using the flood simulator application to generate a map of suggested sandbag placements around the structure. It further displays the map of suggested sandbag placements on a screen of a computing device. Sandbags comprising RFID tags are then placed around the structure at the suggested placements, and the actual placements of the sandbags is determined based upon signals emitted by the RFID tags.

In yet another aspect, embodiments include a system for mitigating damage due to flooding that has a plurality of sandbags, each incorporating an RFID tag, and a computing device which has a virtual home application in communication with a flood simulation application. It also has a plurality of RFID readers in communication with the RFID tags. In the event of a forecasted flooding, the flood simulation application is configured to produce a virtual map which is displayed on a screen of the computing device, the virtual map showing suggested placements of the sandbags, as suggested by the flood simulation application. After the sandbags have been deployed, the computing device is configured to determine the sandbags' actual placement and to compare the actual placement of the sandbags to the suggested placement of the sandbags.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings like reference numerals designate corresponding parts throughout the drawings.

FIG. 12 is a chart showing factors a virtual home system may use to make a map of the locations of currently deployed sandbags, in an embodiment.

DESCRIPTION OF EMBODIMENTS

Figure 1:
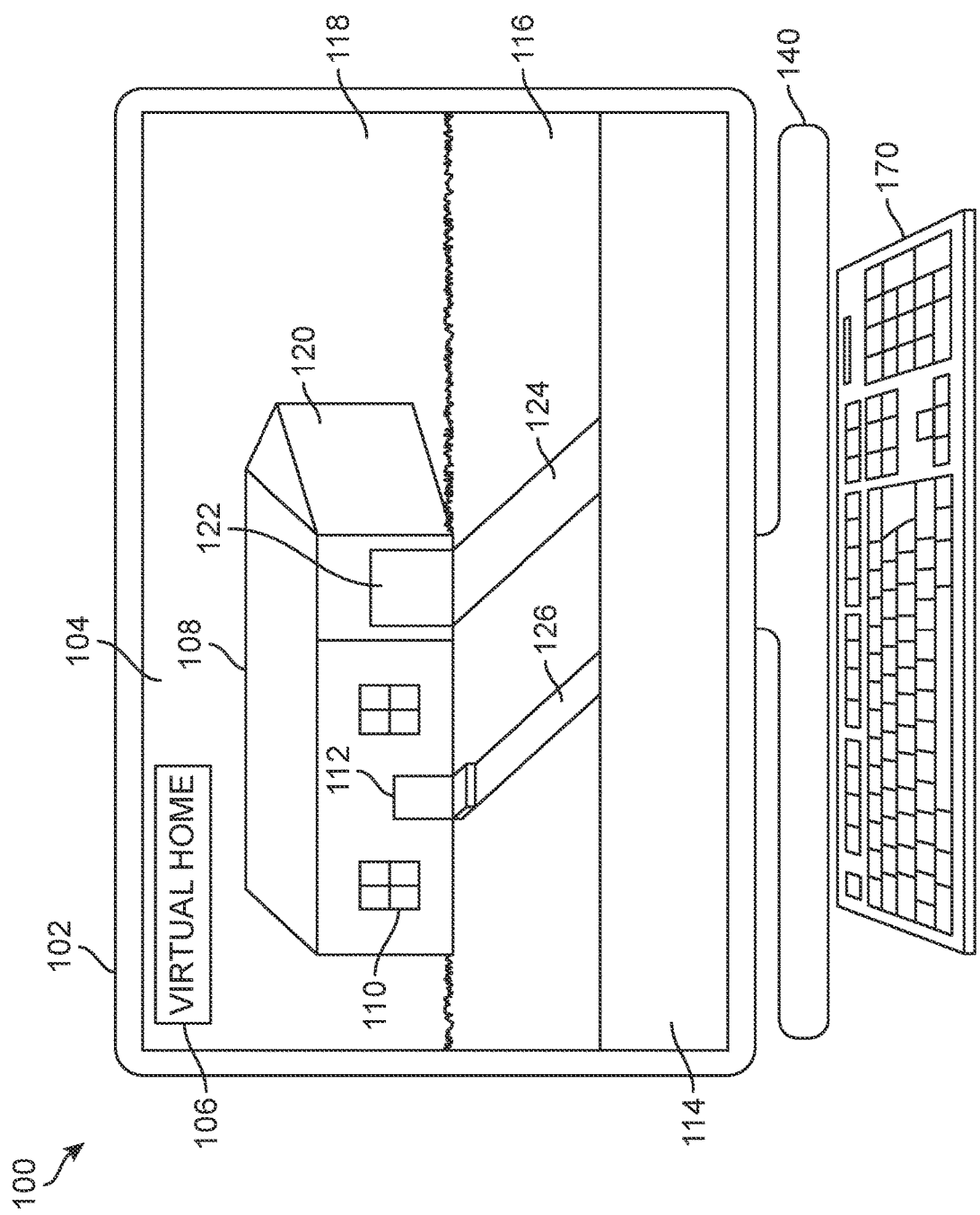
FIG. 1 is a schematic diagram of a virtual home illustrating a perspective view of a home as shown on a computer screen, in an embodiment.

Embodiments disclosed herein establish systems and devices which utilize virtual reality technologies to improve the deployment of sandbags to mitigate flooding. In one embodiment, a system uses local weather information, local topographical information and current flooding conditions to produce a virtual map showing suggested sandbag deployment to mitigate flood damage of a user's home, business, building or other structure. Such a virtual map is interactively displayed in a virtual home environment that the user interacts with via an avatar, in one embodiment. RFID tags that incorporate RFID chips, or any other suitable near field identification technology, are placed inside sand bags that may be deployed to protect the home business, building or other structure. Using this information, the system can compare the actual locations of these sandbags to the suggested deployment to alert the user of any discrepancies in one embodiment.

In many embodiments, the system may use triangulation to determine the locations of the RFID tags. Basically, the distance from each individual tag to two or more chip readers may be determined based upon the time lag in receiving a response from the RFID tag. Each RFID reader may thus calculate the distance from the RFID reader to the RFID tag, and the system may then use triangulation to determine the location of the RFID tag. In some embodiments, when relying on only two RFID readers, "outlier" locations (such as when the one of two possible locations is further away from the perimeter of the home or other structure than a predetermine distance) may be rejected. In other embodiments, disambiguation may be resolved with the aid of video cameras. In other embodiments, the system may eliminate ambiguity through the use of three (or more) RFID readers.

In further embodiments, a water detecting device is coupled to RFID tags inside the sand bags so that the system detects the current water level at the location of the sandbags.

In some embodiments, the system may use an avatar "walking" through the home (or other structure) in a virtual reality display to demonstrate to the homeowner (or other responsible person) the proper installation of sandbags. In some cases, after the homeowner (or other responsible person) has installed sandbags, the system may (possibly with the use of an avatar) show the homeowner (or other responsible person) where additional sandbags should be placed or where certain sandbags may be removed.

In these embodiments, the system may rely on current or forecast weather conditions, data regarding the topography of the local terrain around the home or other structure, and historical flooding data in making its determinations as to where sandbags should be placed. In yet other embodiments, the system may provide the homeowner (or other responsible person) with a list of local retail outlets that have critical materials and tools in stock, should such materials and tools be needed.

The terms "application" and "app" will be used interchangeably herein and refer to a software program installed in a computer's memory for carrying a specific function or set of functions. The terms "home" or "house" will be used interchangeably herein, and shall refer to a home, a house, a commercial building, a warehouse, a hospital, a school, and buildings on a campus, as well as to other structures that may need protection in the event of a flood. The terms "computer" and "computing device" shall be used interchangeably herein, and will refer to desk top computers, laptop computers, notebook computers, tablets, smart phones and to any other computing devices ranging from main frame computers to handheld computers. The term "responsible person" shall refer to the homeowner of a house, to the manager or owner of a business, and/or to the person responsible for instituting mitigation measures in the event of a forecasted or predicted severe event, such as predicted flooding due to a hurricane, a tsunami, or a breach of an upstream dam, for example.

FIG. 1 is a schematic diagram 100 of a virtual home application 106 illustrating a perspective view of a typical home on the screen 104 of a computer 102, in an exemplary embodiment. Schematic diagram 100 shows the home prior to any forecast of a severe flooding event. As shown in FIG. 1, virtual home app 106 displays a virtual reality image of the home of a user. Although not shown in FIG. 1, an avatar representing the user in this virtual home environment may be displayed on screen 104, if requested by the user. In order to provide context and to provide points of reference, virtual home application 106 may display, for example, a representation of the home 108; a representation of windows 110; a representation of the home's front door 112; a representation of the home's front walk 126; a representation of the home's driveway 124; a representation of a street in front of the home 114; a representation of the home's garage door 122; representations of areas around the home 116 and 118; and a representation of garage 120. The display of certain features, such as windows 110, door 112 and driveway 124 serve to provide points of reference for the person responsible for placing sandbags along certain boundaries of the home or other structure, as suggested by virtual home app 106. In this example, computer 102 is supported by a pedestal 140. The user may use keyboard 170 to access virtual home app 106.

In this example, the ground 116 in front of home 108 is relatively flat, whereas the ground 118 towards the back of home 108 slants downwards. In this example, depending upon the severity of the storm, home 108 may need more protection around portions of its sides and at its rear than at the front of the home. In the event of flooding due to a hurricane or other event, in this example, the water at the front of the home may be only a few inches deep, whereas the water at the back of the house may be several feet deep.

Figure 2:
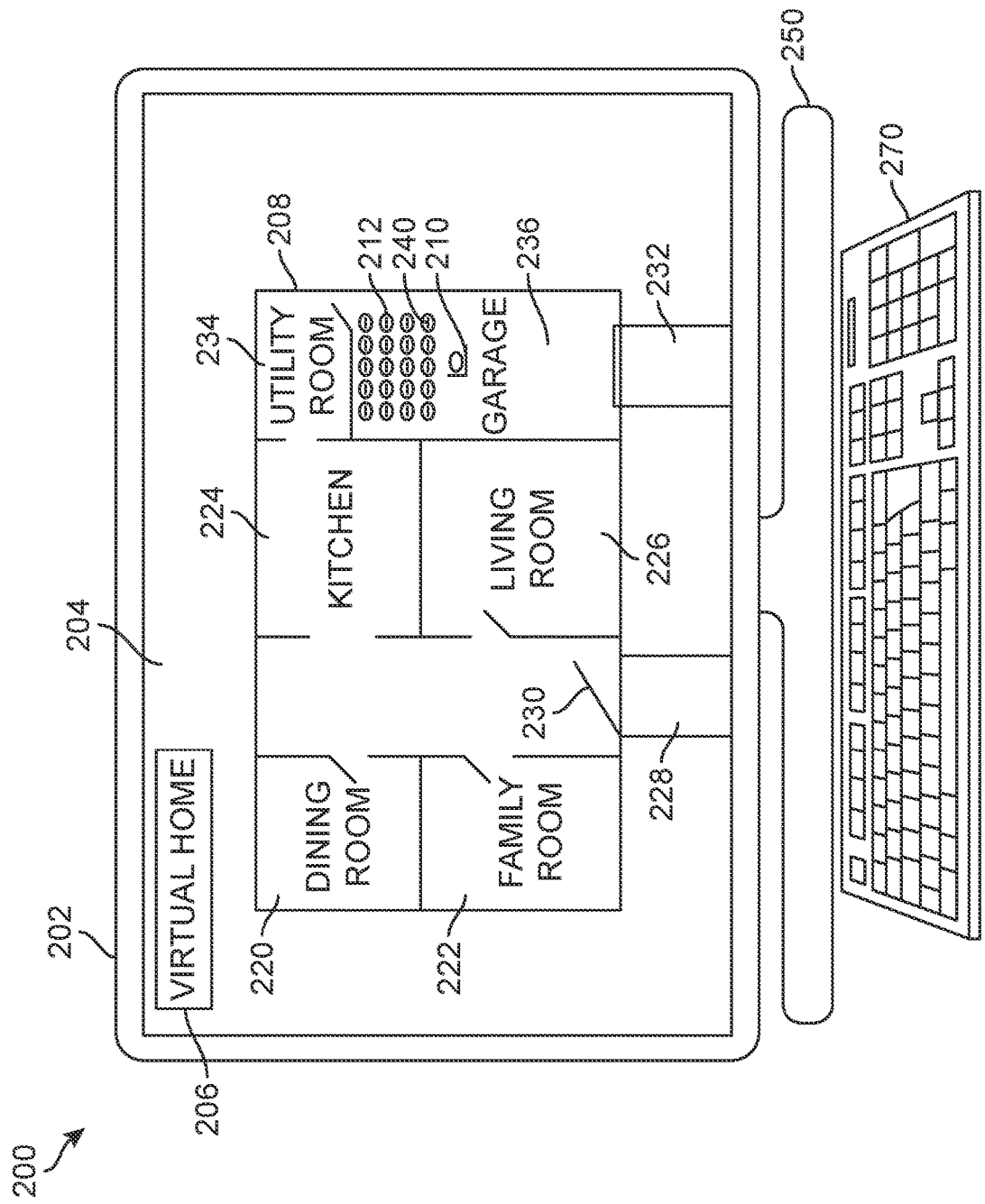
FIG. 2 is a schematic diagram of a virtual home illustrating a floor plan view of a home on a computer screen, in an embodiment.

FIG. 2 is a schematic diagram 200 of a virtual home application 206 illustrating a floor plan view 208 of a home on the screen 204 of a computer 202, in one embodiment. In this example, computer 202 is supported by a pedestal 250. Keyboard 270 may be used to access virtual home app 206. An avatar 210 representing the user has stored sandbags 212 in the garage 236 of the virtual home. This may be, for example, because the user in the real world is storing sandbags in this area and the avatar is tracking the user's actions, and monitoring the placement of sandbags. In order to provide context, virtual home application 206 includes a schematic representation of the home's dining room 220; a schematic representation of the home's family room 222; a schematic representation of the home's front door 230; a schematic representation of the home's living room 226; a schematic representation of the home's kitchen 224; a schematic representation of the home's front walk 228; a schematic representation of the home's driveway 232; a schematic representation of the home's utility room 234; and a schematic representation of the home's garage 236. In this example, sandbags 212 are shown in schematic diagram 200 as being stored in garage 236, although in other cases the sandbags may be stored in a shed, in a basement, or at an off-site facility.

Sandbags 212 include RFID tags 240 that incorporate RFID chips, that may be used to locate the sandbags (as described below) as they are being deployed around the home in the event of a flood. The homeowner, represented in FIG. 2 by avatar 210, may have installed an RFID-locating system in the garage or elsewhere in the home or nearby, as described below with reference to FIG. 10. The RFID system may, for example, be based upon RF waves broadcast by two or more emitters located at two corners of the garage, for example, or located elsewhere within the house or in the vicinity of the house. The RFID system may use triangulation technologies or other technologies listed below to identify the locations of individual sandbags to within, for example, six inches or so, and in any event to less than 24 inches. As a general rule, the RFID readers may be located at or near the ceilings of the home or other structure or in any case above historical flood levels, so that they do not become disabled by any flood waters. In some cases, the RFID readers are provided with battery backups, so that they remain powered even when though the power grid may be inoperative due to the hurricane or other event.

Figure 3:
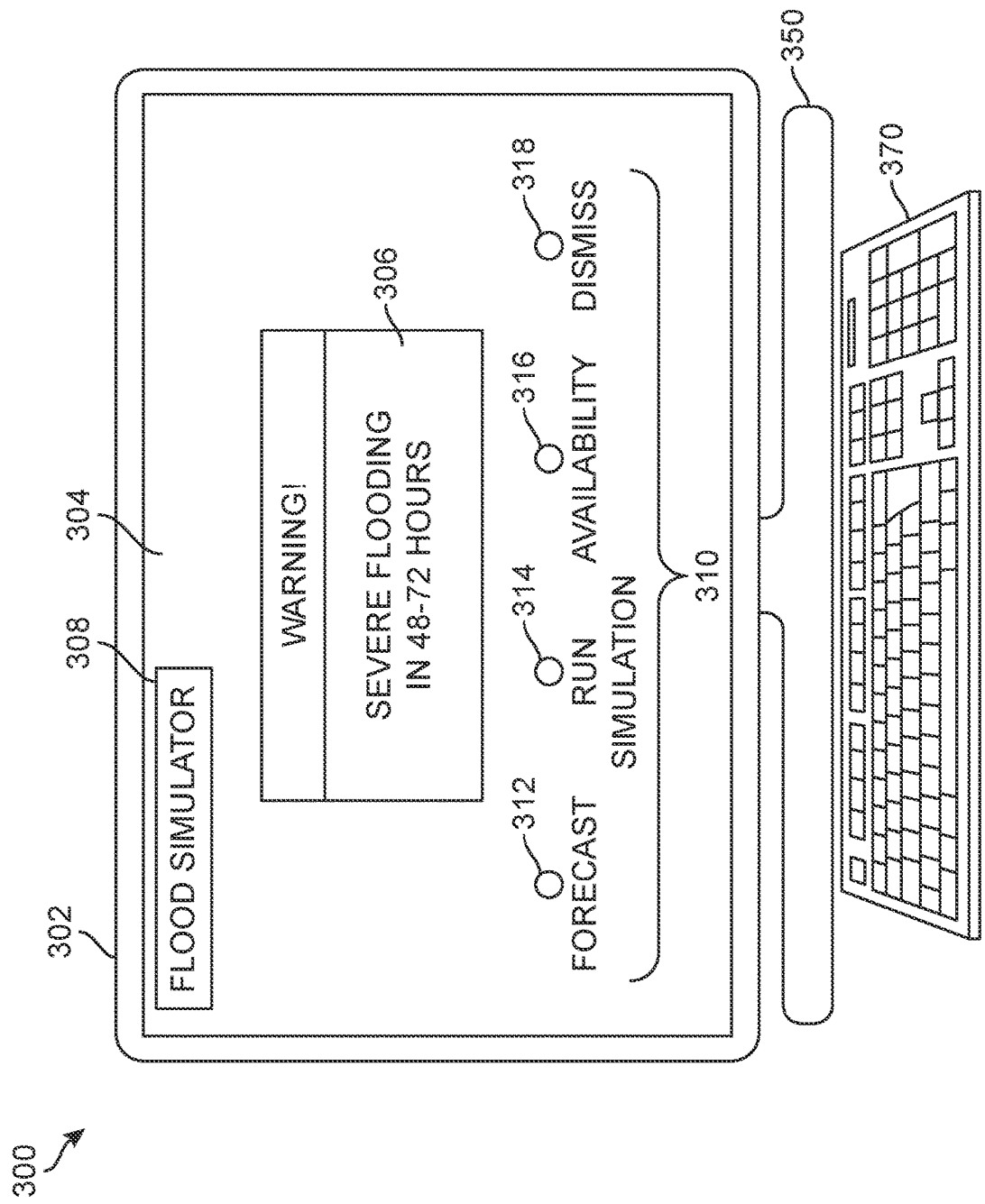
FIG. 3 is a schematic diagram of a warning message displayed by a flood preparedness module of a virtual home app, in an embodiment.

FIG. 3 is a schematic diagram 300 of a warning message 306 that may be displayed by a flood simulator module 308. Flood simulator module 308 may be a separate application installed in computer 302, or it may be part of the virtual home application. In this example, computer 302 is supported by pedestal 350, and has a separate keyboard 370. In other cases, the computer may be a laptop computer, a tablet, or other computing device. In one embodiment, as part of its operations, the virtual home application checks local weather information and receives reports regarding possible flooding in the vicinity of the home. Upon receipt of information indicating that flooding is possible in the vicinity of the home, it produces warning message 306. Note that, in this embodiment, this warning 306 is displayed on computer screen 304, but such a warning could be displayed to the user via any suitable means, such as via virtual reality goggles, for example, or it could be transmitted, for example, to the user's smartphone.

Warning message 306 includes potential flooding information. In some embodiments, the user may be invited to select from a set of options 310 to respond to warning message 306. The set of options 310 may include, for example, a button 312 for viewing the weather forecast; a button 314 for running a simulation to determine different possible flooding scenarios for the property; a button 316 for displaying the availability in nearby stores of flood preparedness products; and a button 318 for dismissing the warning. In other embodiments, any critical information such as when the flood is expected to reach the property and the projected depth of the flood waters may be displayed automatically, without requiring any action by the user.

Figure 4:
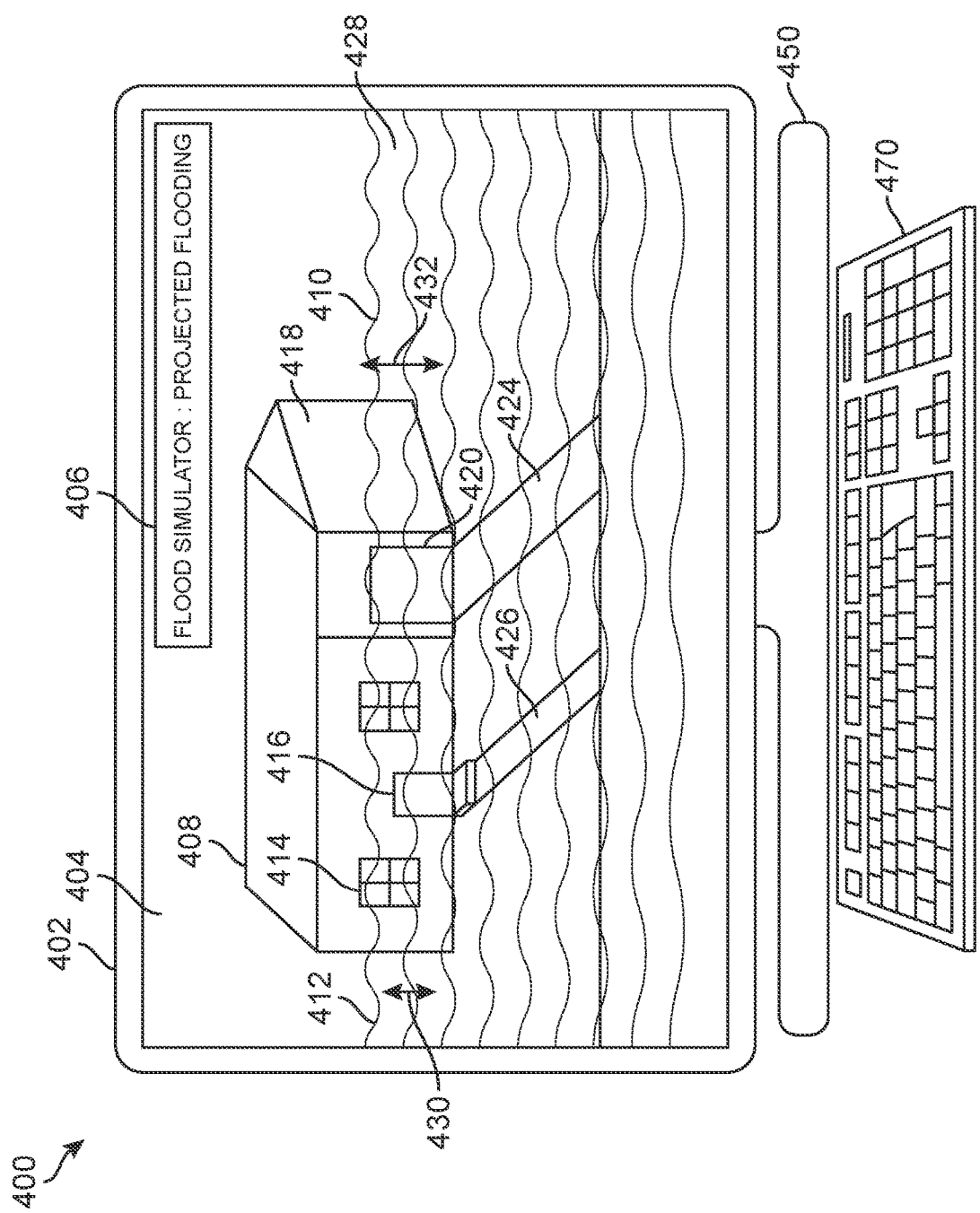
FIG. 4 is a schematic diagram of a perspective view of a virtual home illustrating the predicted flooding in a worst-case scenario on a computer screen, in an embodiment.

FIG. 4 is a schematic diagram 400 of a perspective view of a virtual home application 406 illustrating predicted flooding 428 in a "worst-case" scenario on the screen 404 of a computer 402, in one embodiment. Computer 402, which is supported by pedestal 450, has a keyboard 470 that may be used to access virtual home app 406. In order to provide context, the display generated by virtual home application 406 includes a representation of the home 408; a representation of windows 414 on the home 408; a representation of the home's front door 416; a representation of the garage door 420; a representation of the home's front walk 426; a representation of the home's driveway 424; and a representation of a wall 418 on the side of the home 408.

In this embodiment, the user has elected to run a flood simulator, which is a program within flood simulation module 406. As noted above, in this embodiment, flood simulation module 406 may be a component of the virtual home application, or it may be installed in computer 402 as a separate application. In other embodiments, flood simulation module may be a separate app in communication with the virtual home application. In this example, flood simulation module 406 is presenting a "worst-case" scenario to the user. In one embodiment, this module uses local weather information, local topographical information and current and/or historical flooding conditions to produce a virtual map showing different possible scenarios for peak flooding in the immediate vicinity of the home. In some embodiments, local topographical information may have been downloaded from a central topographic database, such as databases maintained by the US Geological Survey. In some embodiments, this information is augmented by applying image analysis techniques to multiple digital images of the terrain surrounding the house. Such images may, for example, be taken by overhead cameras (for example, mounted on drones) that may be deployed to obtain these digital images as part of the virtual home environment system.

In the example shown schematically in FIG. 4, the house itself is on horizontal ground and the terrain in front of the house is generally flat. However, the terrain on either side of the house slopes down towards the back yard. The depth of the water around the house resulting from flooding is illustrated by depth arrow 432 and depth arrow 430. Depth arrow 432 is longer than depth arrow 430. This indicates that the water is deeper on the right-hand side of the house next to wall 418 than on the left-hand side of the house, because the slope on the right side of the house is steeper than the slope on the left side of the house. Thus, owing to changes in terrain around the home, the depth arrows may change in length around the home. Because the slope of the terrain around the home declines moving from property area 412 to property area 410, depth arrow 432 is longer than depth arrow 430.

Figure 5:
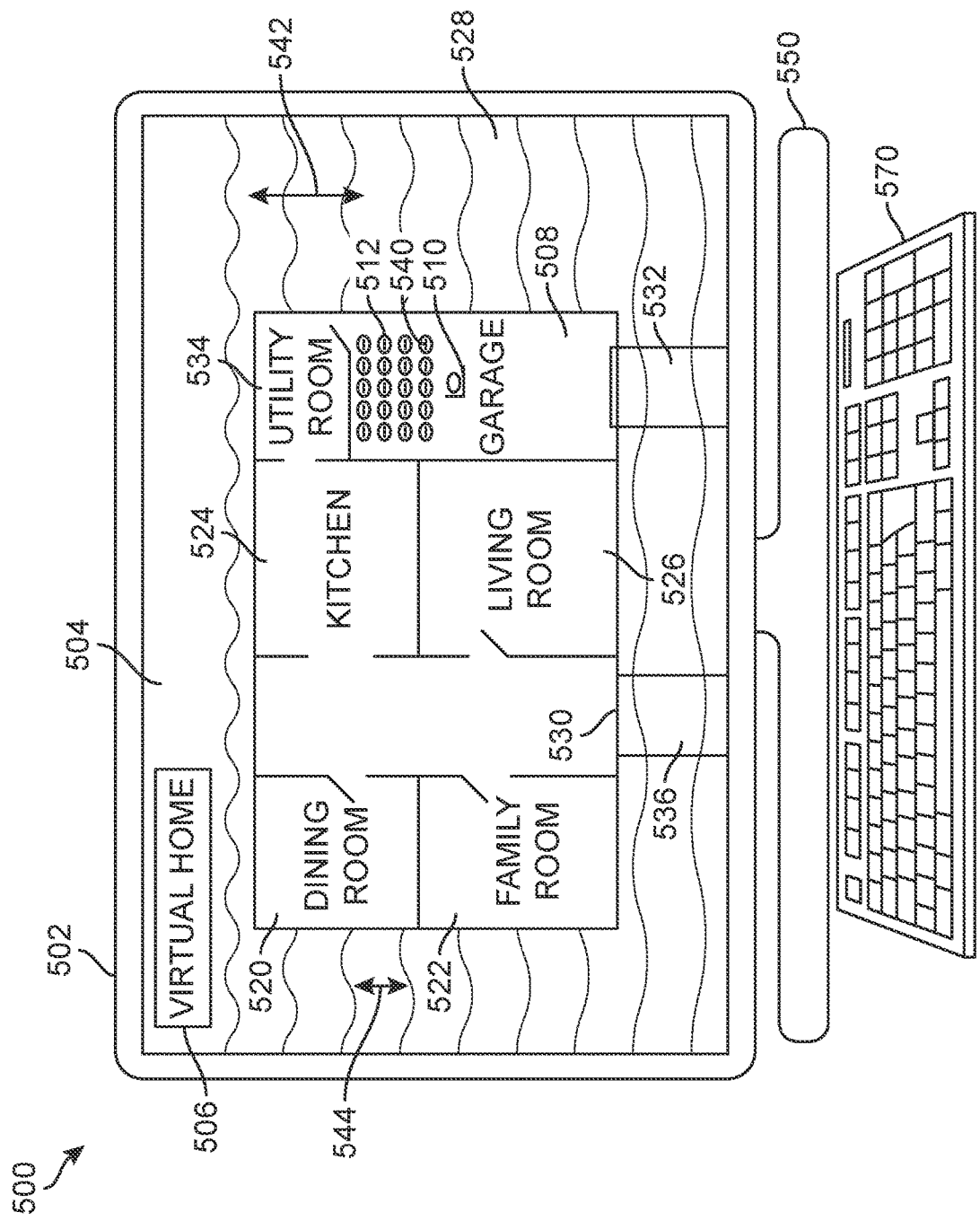
FIG. 5 is a schematic diagram of a floor plan of a virtual home illustrating predicted flooding in a typical scenario on a computer screen, in an embodiment.

FIG. 5 is a schematic diagram 500 of a floor plan view of a virtual home application 506 illustrating predicted flooding 528 in an "average" scenario on the screen 504 of a computer 502, in one embodiment. In this example, computer 502 has a support pedestal 550 and a keyboard 570. In order to provide context and to provide reference points for the description below, virtual home application 506 includes a representation of the home's dining room 520; a representation of the home's family room 522; a representation of the home's front door 530; a representation of the home's living room 526; a representation of the home's kitchen 524; a representation of the home's front walk 536; a representation of the home's driveway 532; a representation of the home's utility room 534; and a representation of the home's garage 508. Also, virtual home application 506 displays the user's avatar 510, through which the user interacts with the virtual home environment application and devices under its control in this embodiment. Virtual home application 506 includes a representation of a set of sandbags 512, each of which (or in some embodiments, many of which) would have an RFID tag 540 that incorporates an RFID chip. The sandbags could then be ready for deployment in case of an actual flooding event to mitigate the damages from the flooding, when a flooding event is predicted.

In this embodiment, the user has elected to run a flood simulation module which is a component of the virtual home application 506 and display an example of an average scenario in a floor plan view. In one embodiment, the module uses one or more of local weather information, local topographical information and current and/or historical flooding conditions to produce a virtual map showing different possible scenarios for peak flooding in the vicinity of the home. In schematic diagram 500, an "average outcome", which is an intermediate outcome between the best-case and the worst-case flooding scenarios, is illustrated with a floor plan view of the virtual home environment.

The depth of the water resulting from the predicted flooding is illustrated by depth arrow 542 and depth arrow 544. Depth arrow 542 is longer than depth arrow 544, indicating deeper depths on the right-hand side of house. As noted above, this is due to changes in terrain around the home. The homeowner (or other person responsible for protecting the structure) may then deploy more sandbags on the right-hand side of the house than on the left-hand side of the house.

Figure 6:
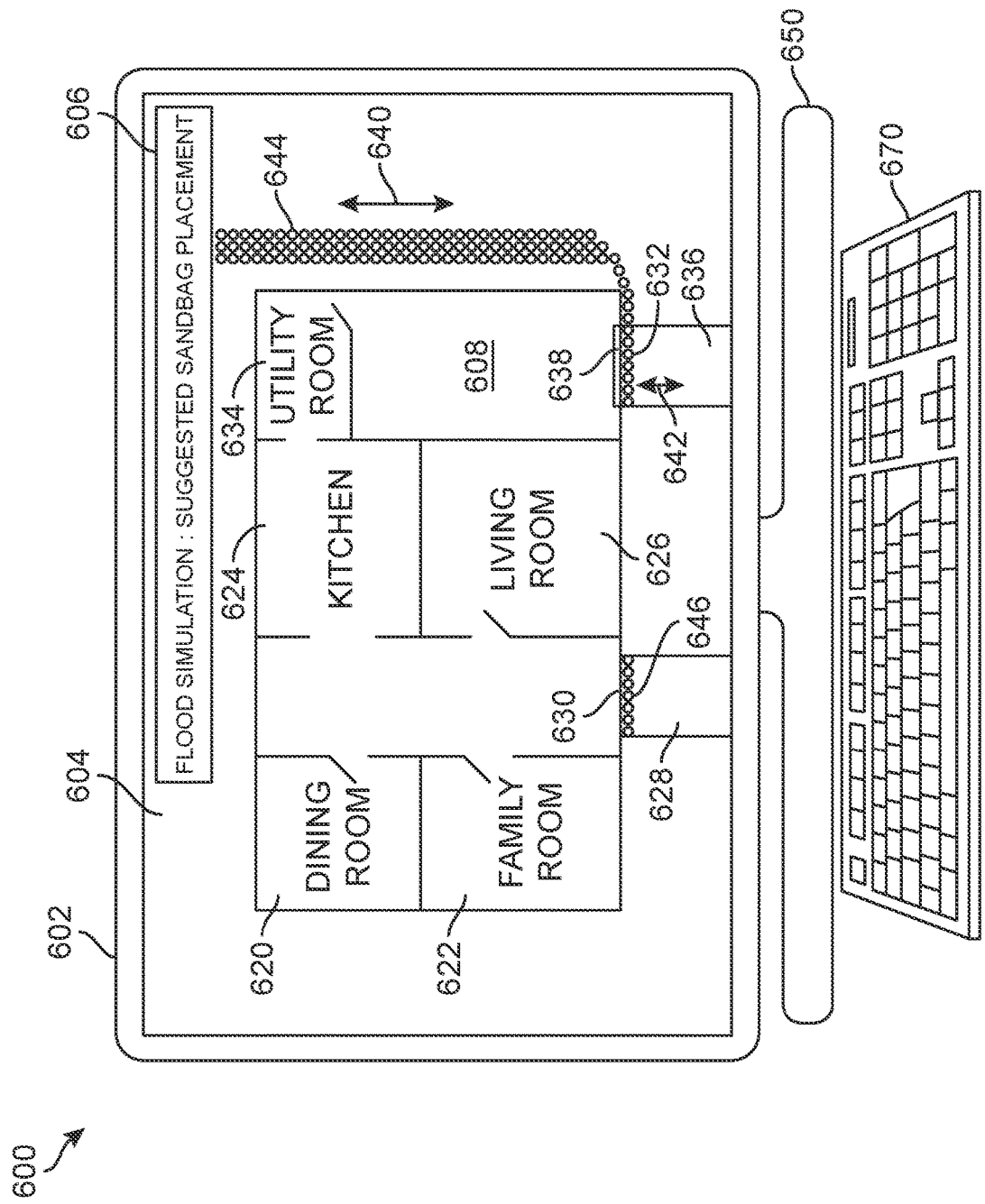
FIG. 6 is a schematic diagram of a virtual home illustrating suggested sandbag placement on a computer screen, in an embodiment.

FIG. 6 is a schematic diagram 600 of a flood simulation module 606 illustrating suggested sandbag placements 646, 644 and 632 to mitigate flood damage to a home on the screen 604 of computer 602, in one embodiment. Flood simulator module 606 may be installed in computer 602 within the virtual home application or it may be separately installed in computer 602. Computer 602 also has a support pedestal 650 and a keyboard 670. In order to provide context, virtual home application 606 includes a representation of the home's dining room 620; a representation of the home's family room 622; a representation of the home's front door 630; a representation of the home's living room 626; a representation of the home's kitchen 624; a representation of the home's front walk 628; a representation of the home's driveway 632; a representation of the home's utility room 634; and a representation of the home's garage 608.

In the embodiment illustrated by schematic diagram 600, a flood simulation module 606 within the virtual home application uses flood simulation models to determine optimal sandbag placements. In the embodiment illustrated by schematic diagram 600, suggested sandbag placement 644 protects low lying areas of the property. Also, suggested sandbag placement 632 on driveway 636 at garage door 638 and suggested sandbag placement 646 at the front door 630 provide extra protection to two of the more vulnerable perimeters of the home. In some embodiments, the user of flood simulation module 606 enters the number and approximate dimensions or weight of the sandbags at his or her disposal to flood simulation module 606, and the flood preparedness module takes this input to produce the optimum deployment of sandbags to mitigate flood damage to the home. In some embodiments, the user of the virtual home application asks the system to produce a sandbag deployment plan based on either a best-case scenario, a worst-case scenario, or an intermediate-case scenario and the flood preparedness module instructs the user regarding the number and dimensions of sandbags required to execute the deployment plan.

Based on such user inputs, flood simulation module 606, computes an optimized sandbag deployment scheme. Flood simulation module 606 may do this based upon, for example, Monte Carlo analysis (as applied to possible sandbag deployments) as well as weather forecasts and flooding forecasts produced in part from local topographical information and from historical information. The optimized sandbag deployment scheme as displayed by flood simulation module 606, includes sandbags 644 along the right side of the home, sandbags 646 at front door 630 and sandbags 632 on driveway 636 in front of the garage 608. Depth arrow 640 indicates the projected depth of the water on the right-hand side of the home, and depth arrow 642 indicates the projected depth of the water on driveway 636 in front of the garage door. These depths in turn indicate the height and depth of the suggested sandbag placements needed at these locations. Note that as the suggested height of the sandbag placement increases, flood simulation module 606 increases the width of the sandbag barrier at its base to maintain the stability of the sandbag placements.

Figure 7:
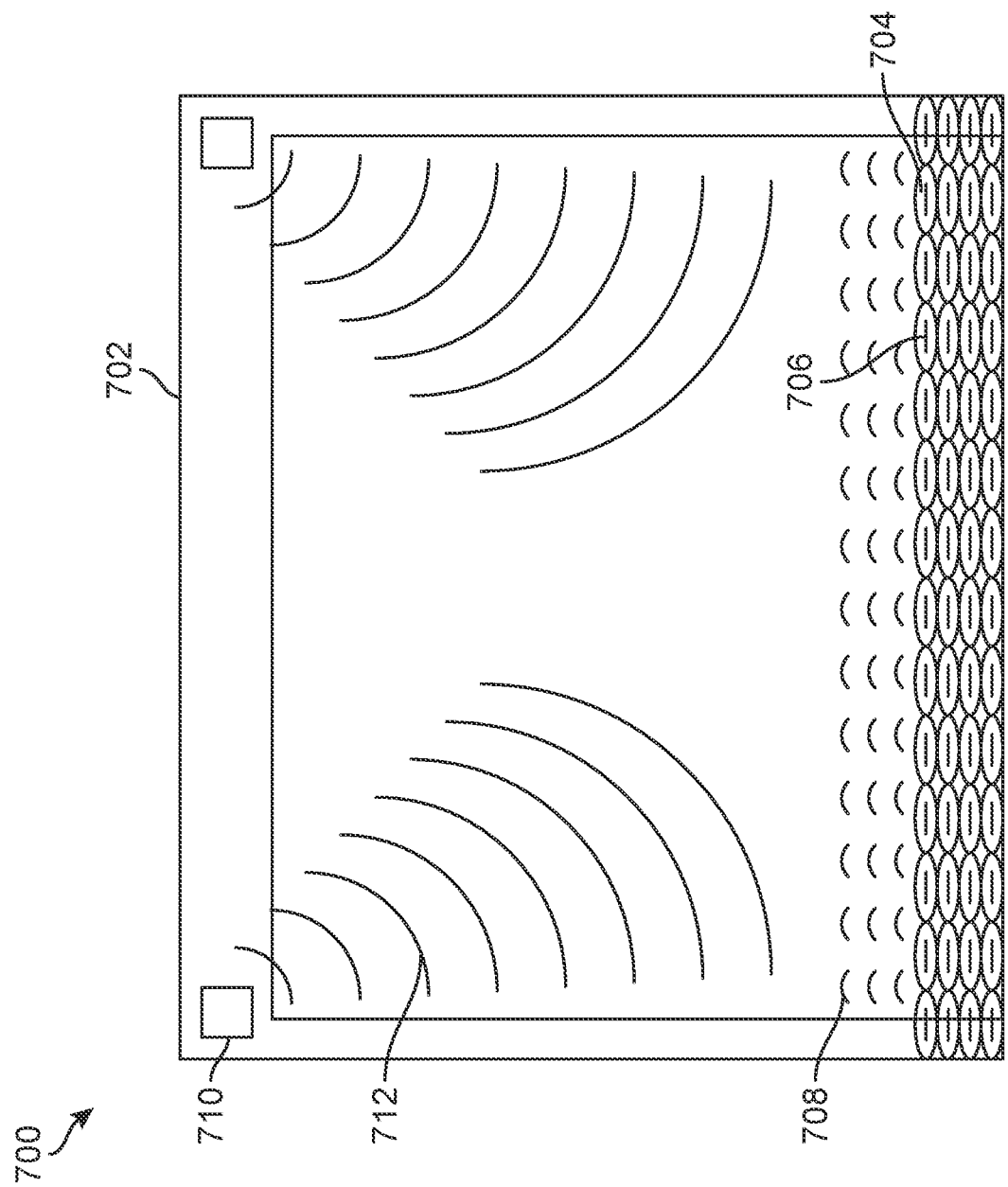
FIG. 7 is a schematic diagram illustrating the deployment of sandbags incorporating RFID tags as shown on a computer screen, in an embodiment.

FIG. 7 is a schematic diagram 700 which illustrates the use of RFID tags that incorporate an RFID chip to create a virtual map identifying the location of sandbags 704 as they are deployed in the real world, in one embodiment. In this embodiment, the user of the virtual home application has deployed a set of sandbags 704 in an attempt to protect various sections of his or her home 702. The flood preparedness module of the virtual home application uses location data obtained from RFID tags 706 to determine the actual locations of sandbags 704, and compares the placement of sandbags 704 to the deployment of sandbags suggested by the flood preparedness module. In this example, each sandbag contains one of the RFID tags 706 used by the flood preparedness system for determining the location of each individual sandbag.

Figure 10:
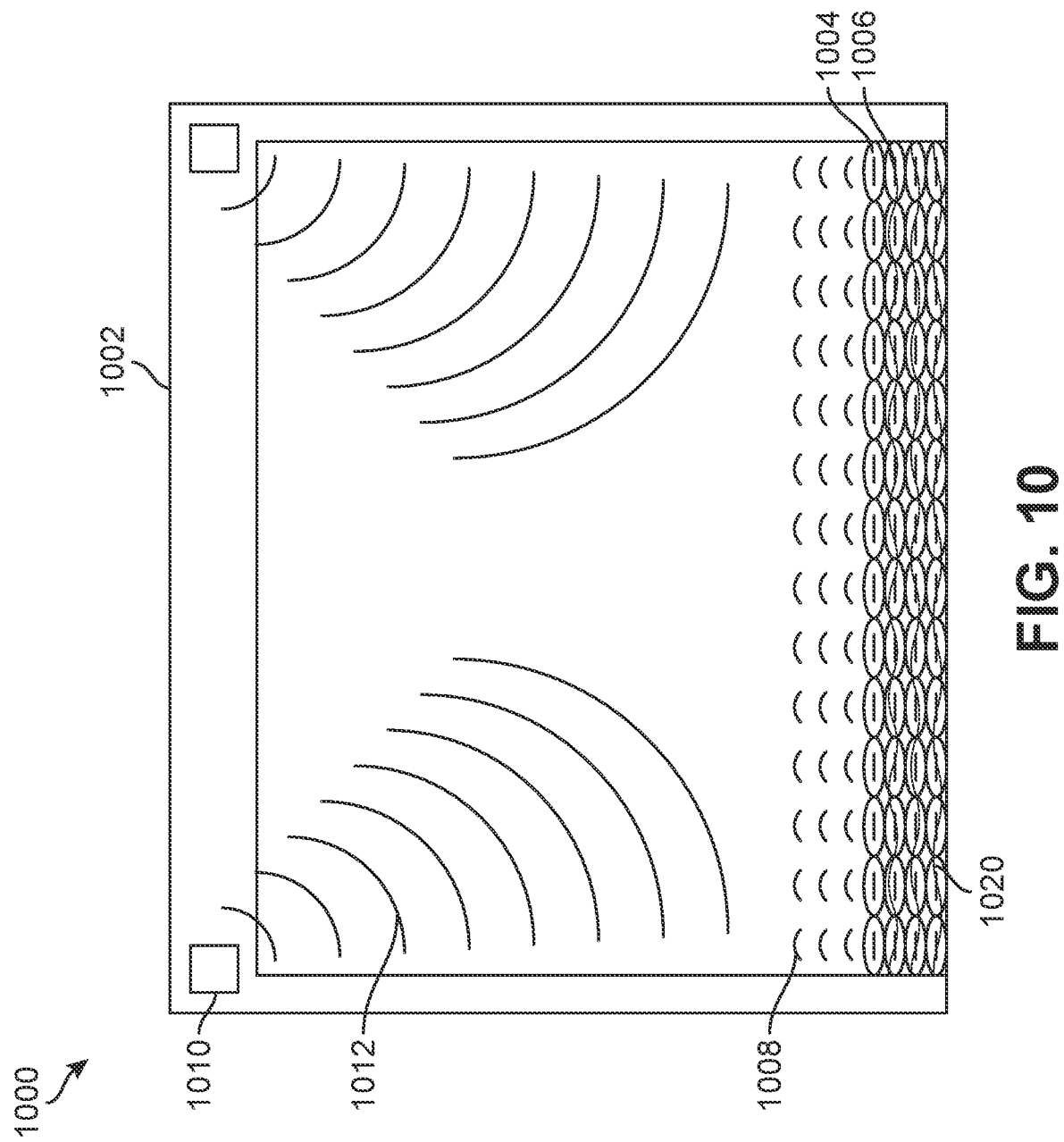
FIG. 10 is a schematic diagram illustrating the use of a water detector coupled to an RFID tag for detecting the current water level, in an embodiment.

In the embodiment shown schematically in schematic diagram 700, RFID readers 710 broadcast an activation signal 712 which activates the RFID tags 706 embedded in each individual sandbag 704 in the set of sandbags to broadcast their unique identifying signals. Such activation occurs when the flood preparedness module is activated by the homeowner (or other responsible person) to determine the locations of each individual sandbag 704 in the set of sandbags. Once activated, RFID tags 706 embedded in sandbags 704 broadcast their unique identifying signals 708 that are received and decoded by at least two RFID readers 710, as shown in FIG. 10. The RFID readers 710 receive the unique identifying signal broadcast by each of the RFID tags 706. By triangulating the unique identifying signal assigned to a particular RFID tag 706, the flood preparedness module is able to determine, within an appropriate margin typically determined by the dimensions of the sandbags (margins such as six inches, twelve inches or 18 inches, for example), the location of each specific sandbag 704 in the set of sandbags. Such specific location information is then used by the flood preparedness module to produce a virtual map showing the current deployment of the set of sandbags 704.

In some embodiments, RFID tags 706 are "passive" tags, whose electrical power supply must be activated by RF waves received from RFID readers 710. In other embodiments, RFID tags 706 are "active" tags that have their own batteries and power supplies, and thus can broadcast their own unique identifying signals. In either case, the RFID signals 708 are received and decoded by RFID readers 710, and used to determine the locations of the sandbags 704.

Figure 8:
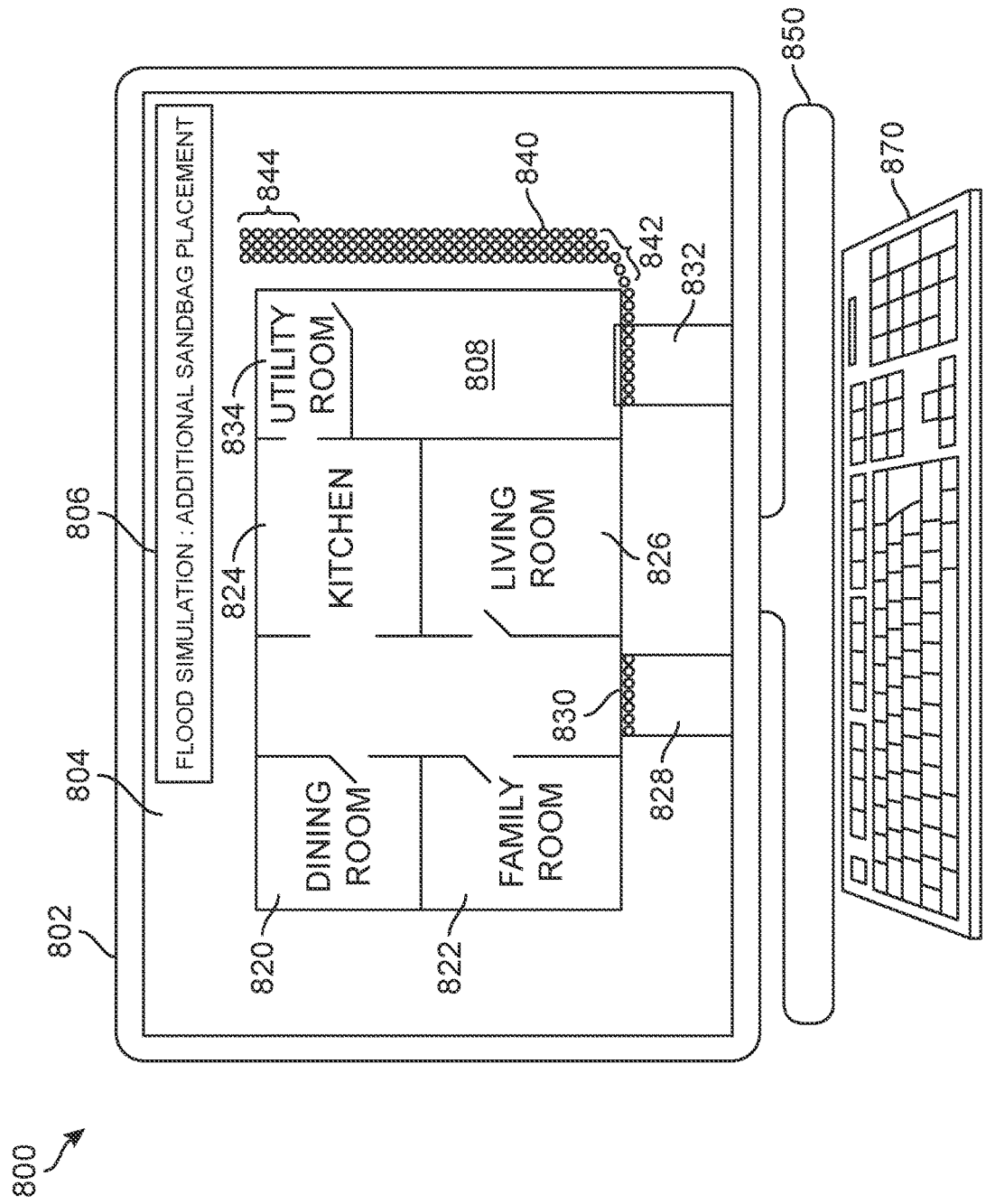
FIG. 8 shows suggested changes to the current deployment of sandbags in the real world on a computer screen, in an embodiment.

FIG. 8 is a schematic diagram 800 of a flood simulation module 806 (implemented as part of a virtual home application) illustrating the proposed deployment of additional sandbag placements 842 and 844 to the current deployment of actual sandbags 840 in the real world. Computer 802 is supported by a pedestal 850 and has a keyboard 870 that may be used to access flood simulation module 806. As shown on screen 804 of computer 802, additional sandbags 842 are deployed at the front corner of the home and additional sandbags 844 are deployed towards the back yard of the home, in one embodiment. In order to provide context, virtual home application 806 includes a representation of the home's dining room 820; a representation of the home's family room 822; a representation of the home's front door 830; a representation of the home's living room 826; a representation of the home's kitchen 824; a representation of the home's front walk 828; a representation of the home's driveway 832; a representation of the home's utility room 834 and a representation of the home's garage 808.

In the embodiment of schematic diagram 800, the user has placed sandbags at critical areas around his or her home in response to suggested sandbag placements suggested by the flood preparedness module of the virtual home application. The module has then produced a virtual map of the sandbags placed by the user. In this example, the user has placed sandbags 840 at the front door, in front of the garage door, and along the right-hand side of the house (but some short distance away.) By comparing the suggested sandbag placements to the virtual map of the sandbags placed by the user, the module has identified additional sandbag placements 842 and 844 to rectify discrepancies it has identified between the sandbag placements suggested by the flood preparedness module 806 and the virtual map of the sandbags as actually placed by the user.

Figure 9:
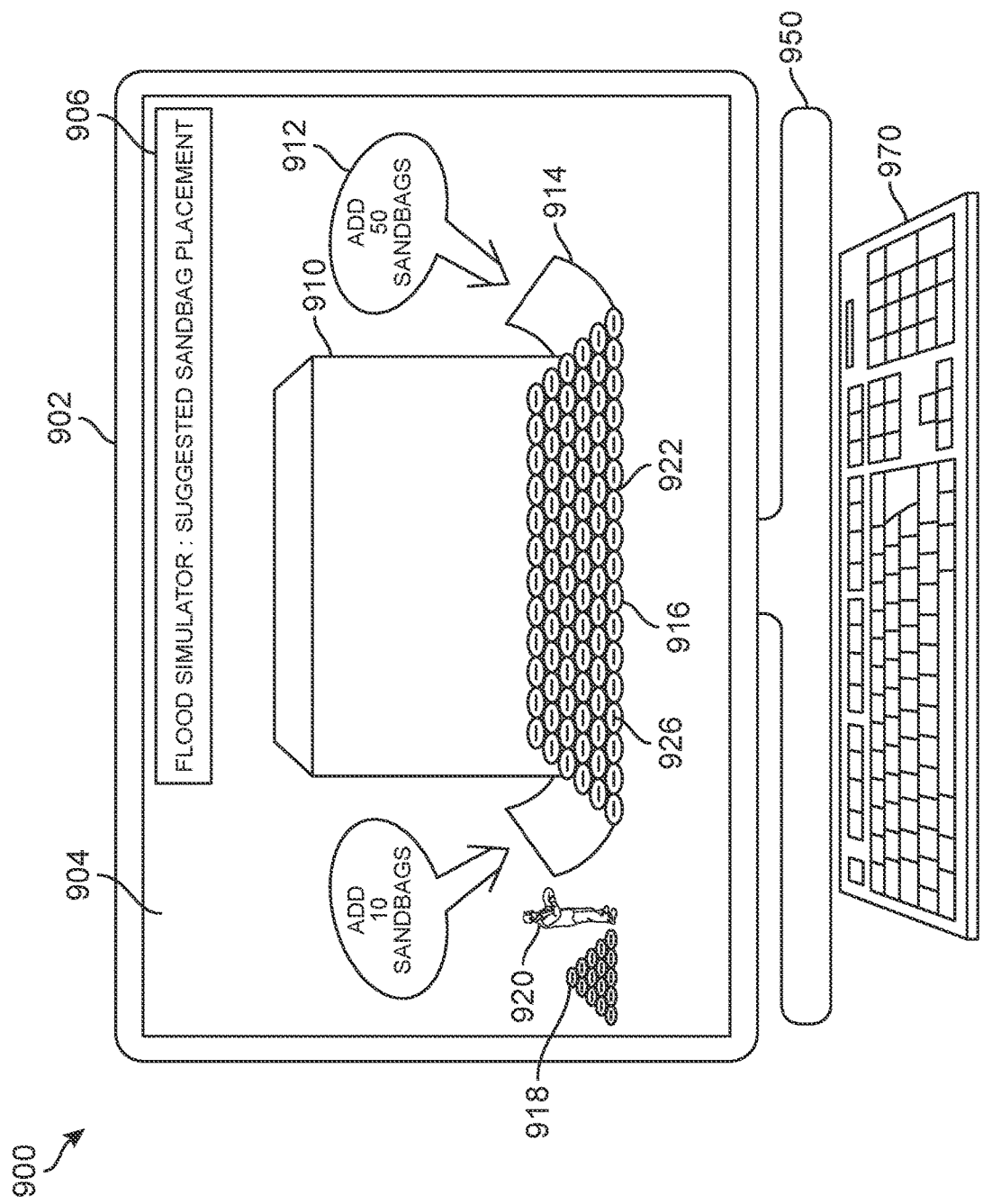
FIG. 9 is a schematic diagram illustrating how a user's avatar virtually implements suggested alterations to the deployment of sandbags, in an embodiment.

FIG. 9 is a schematic diagram 900 of a display produced by a flood simulator 906 in a virtual home application. This schematic diagram illustrates how a user's avatar 920 virtually implements some of the additional sandbag placements to the current deployment of sandbags 916 on the screen 904 of a computer 902, in one embodiment. Showing the user how the user's avatar 920 implements these suggested alterations may help the user in making these alterations in real life. Computer 902 is supported by pedestal 950. Keyboard 970 may be used to access flood simulator 906. Home 910 is shown in an end view, for example from the right-hand side of the home. Instructions 912 on either side of the home 910 require the user to add 50 sandbags 916 on the right of the image (which is to the back of the home) and another 10 sandbags 916 to the left of the image (which is to the front of the home) at locations 914 shown in outline on either side of home 910. This view provides contextual detail to specify exactly to the user where these additional sandbag placements should be made. In this embodiment, flood simulator 906 shows the current placement 922 of sandbags 916. Instructions 912 for additional sandbag placements are indicated by large arrows directing where the user should place the additional sandbags. In this example, the instructions also explain approximately how many sandbags would be needed to fulfill these additional placements.

Additionally, a video display on screen 904 in FIG. 9 shows avatar 920 taking sandbags 916 from a pile 918 of reserve sandbags 916 to place on the suggested locations. In the more general case, the sandbags 916 could be placed in position using mechanical equipment, such as forklifts or wheel loaders, for example. In most embodiments, each of the sandbags 916 contains an RFID tag 926 that incorporates an RFID chip and that allows the system to keep an up-to-date map of sandbag placement throughout the home, store, office or institution.

Figure 11:
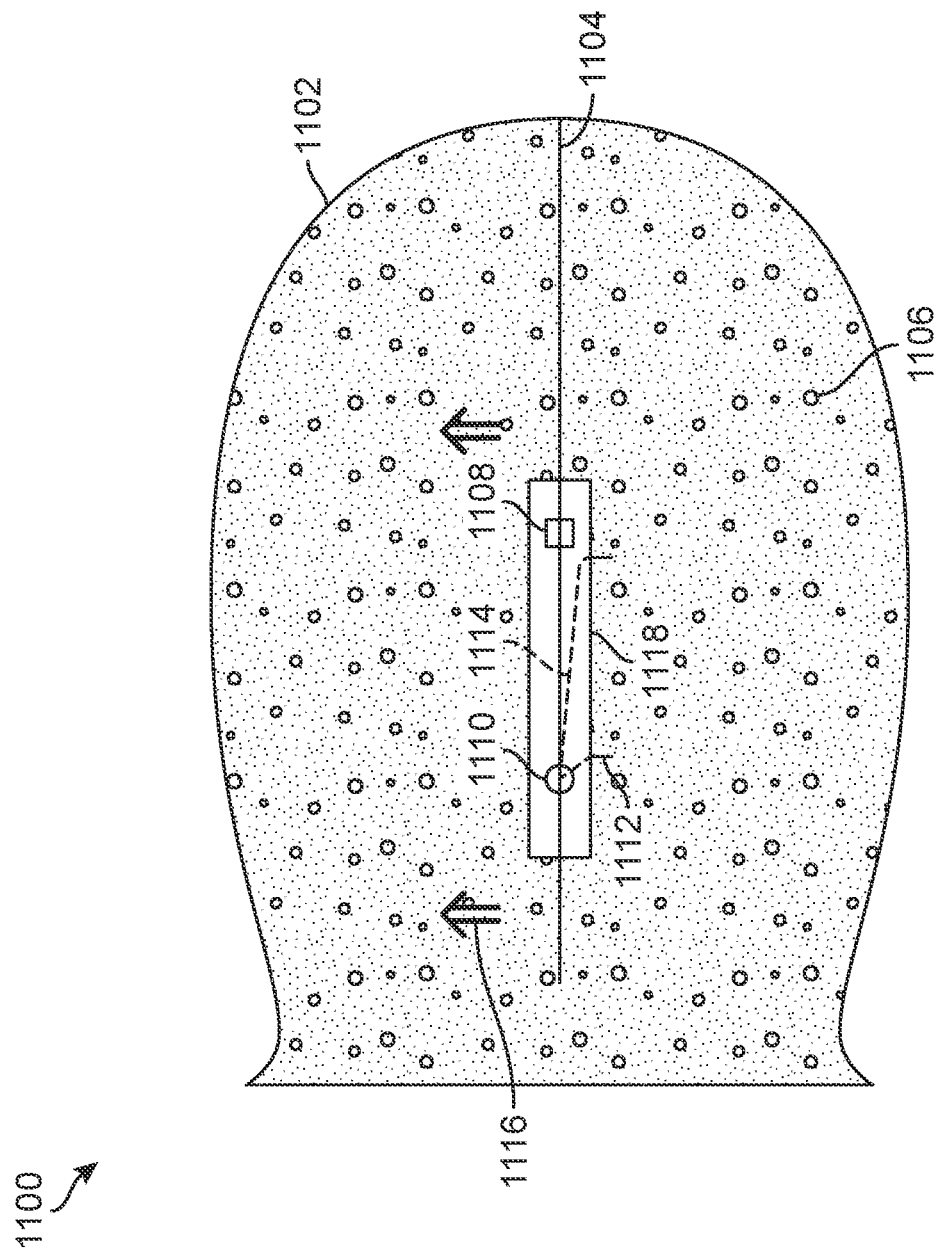
FIG. 11 is a schematic diagram of a sandbag equipped to broadcast its location and the presence of water, in an embodiment.

FIG. 10 is a schematic diagram 1000 and FIG. 11 is a schematic diagram 1100 illustrating in combination the use of water detection devices coupled to RFID tags 1006 that incorporate an RFID chip for detecting the current water level in one area of a home, in one embodiment. In the embodiment of schematic diagram 1000, water has flooded an area around the user's home 1002. A set of deployed sandbags 1004 is protecting a perimeter of the home 1002 or other structure from the floodwaters. Note that some of a set of deployed sandbags 1004 are above the level of the flood water 1020, and some are already submerged within water 1020. RFID readers 1010 have broadcasted activation signals 1012, which have activated the RFID tags 1006 so that each RFID tag will broadcast its unique identifying signal 1008. As shown in FIG. 10, some of the sandbags 1004 are already partially or wholly submerged in the flood waters, while others are still above the water level. When water level 1020 reaches partway up sandbags 1004, one of the water-detecting devices (described below with reference to FIG. 11) coupled to an RFID tag senses that the water level has reached that RFID tag.

The RFID tag may then notify chip readers 1010 that water has reached that particular sandbag. For example, the RFID tag may pulse its unique identifying signal to notify the RFID readers 1010 that the water level has reached the sandbag. In other cases, the RFID tags may send a separate signal notifying the system that water has reached that sandbag. Note that RFID tags 1006 that become completely submerged may have their identifying signals 1008 compromised, so that detecting the water level and notifying the chip readers 1010 when the water first reaches an RFID tag may be necessary. In some cases, the system may use the deactivation of certain of the RFID tags, or the reduction in the signal strength received from those RFID tags as indicating that the water level has reach certain sandbags. By triangulating the RFID signals at two or more RFID reader locations, the flood preparedness module of the virtual home application can monitor the rise of water level 1020. In some embodiments, the flood preparedness module of the virtual home application program alerts the user to the height of water level 1020 as it rises due to increased flooding.

FIG. 11 is a schematic diagram 1100 of a sandbag 1102 equipped to broadcast its location and the presence of water, in one embodiment. In this example, sandbag 1102 is bisected by a horizontal plane 1104 attached to the interior surface of the sandbag, dividing sandbag 1102 into two compartments. In some embodiments, plane 1104, may be a heavy polypropylene envelope or sleeve to protect the RFID tag. The surface of sandbag 1102 features "This Side Up" arrows 1116 so that sandbag 1102 can be oriented so as to operate properly to detect when water has reached water detector 1110. Sandbag 1102 is filled with sand 1106 so as to provide a barrier directing floodwaters away from the home, building and/or structures.

A module 1118 embedded in sandbag 1102 at plane 1104 contains an RFID tag 1108 that incorporates an RFID chip in communication with a water detector 1110. Wires 1114 connect water detector 1110 to probes 1112. Sandbag 1102 is designed to be oriented so that probes 1112 protrude down from the bottom of module 1118 so that water detector 1110 can detect the water level of a flood as it rises up from the bottom of sandbag 1102. For example, water detector 1110 may include a current meter that determines that water has reached probes 1112 based on the current flowing between the probes. In other embodiments, the water detector 1110 may use other techniques for detecting the presence of water. Once water detector 1110 detects that probes 1112 are immersed in water, it sends a detection signal to RFID tag 1108. The detector signal could be, for example, pulsing the RFID signal, sending a separate signal, or simply stopping to send signals. When RFID tag 1108 receives the detection signal, it modifies its unique identification signal so that a set of RFID readers triangulating RFID tag 1108 is notified that the water level has reached sandbag 1102 and can communicate this information to the flood preparedness module of the virtual home environment system.

FIG. 12 is a chart 1200 showing an RFID locating app 1202 that uses a set of factors 1204 in a flood preparedness module of the virtual home application. It uses these factors to make a virtual map of the locations of the currently deployed sandbags, in an embodiment. Factor 1206 refers to using triangulation of the identifying signal broadcast by a specific RFID tag to determine the location of its associated sandbag. By receiving this signal at multiple RFID reader locations, the approximate location of the sandbag can be determined using well-known triangulation methods to within an acceptable tolerance (such as six inches, twelve inches or 18 inches, depending on the dimensions of the sandbag). For example, the tolerance should be no more than half the length of the sandbags. Factor 1208 refers to using image analysis on digital images from multiple cameras integrated into the virtual home environment system to confirm the results obtained using triangulation factor 1206. In some cases, when the expected placement of the sandbags is generally known such that the cameras can be focused on the expected sandbag location, factor 1208 may be used instead of factor 1206. Factor 1210 refers to using averaging methods, over time and space, to improve the accuracy of the location information determined from the triangulation method of element 1206.

In some embodiments, because the RFID tags are stationary, multiple determinations of the location of a particular chip can be averaged to improve the accuracy of the location. In some embodiments, because the currently deployed sandbags would normally be placed within a certain perimeter, outlying location information that place the sandbags well outside that perimeter is ignored in producing the virtual map of the currently deployed sandbags. In some embodiments, data smoothing methods are applied to the set of the individual RFID tag locations to produce a continuous pattern for the currently deployed sandbag locations for the virtual map. Factor 1212 refers to using user input to check the virtual map of the locations of the currently deployed sandbags. For example, when only two RFID readers are used, the user may need to select which location is correct. In other cases, use of three or more RFID readers improves the location determination. In other embodiments, analyses of images obtained from video cameras aimed at likely sandbag placements may be used either to supplement or to disambiguate sandbag locations. In some embodiments, the flood preparedness module of the virtual home application asks the user if the virtual map produced by the methods of elements 1206, 1208 and 1210 is accurate and allows the user to make changes to the virtual map if necessary.

Although the drawings and their accompanying descriptions present the embodiments in terms of a home, these drawings and descriptions apply equally to other structures that may need protection in the event of a flood, such as businesses, schools, hospitals, stores, warehouses, office buildings, apartment buildings, university buildings, sports arenas and other structures.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for mitigating damage due to flooding comprising:
   a virtual home application installed in a computing device; and
   a flood simulator application installed in the computing device that is in communication with the virtual home application;
   wherein the virtual home application comprises a virtual map of a structure and of the topography of terrain adjoining the structure;
   wherein the virtual home application is configured to display the structure on a screen of the computing device and to show an avatar walking within the structure and around the structure as directed by a user;
   wherein the flood simulator application is configured to receive forecasts related to flooding;
   wherein the flood simulator application is configured to evaluate the extent of flooding around the structure based upon the forecasts related to flooding; and
   wherein the flood simulator application is configured to:
      responsive to receiving sandbag dimensions and/or weight input by the user, automatically determine optimal placement for sandbags so as to mitigate damage due to the flooding by generating a modified version of the virtual map, the modified version of the virtual map including graphical representations of sandbags overlaid at the determined optimal placement locations, and displaying the modified version of the virtual map on a screen of the computing device.

2. The system of claim 1, wherein a plurality of the sandbags comprise an RFID tag, further comprising a plurality of RFID readers in communication with the RFID tags in the sandbags.

3. The system of claim 2, wherein the system is configured to determine the locations of the sandbags based upon signals emitted by the RFID tags and received by the RFID readers.

4. The system of claim 3, wherein the system uses at least one of triangulation and image analysis to determine the locations of the sandbags.

5. The system of claim 2, wherein the sandbags comprise water detectors in communication with the RFID tags and the RFID tags are configured to report the detection of water by the water detectors to the computing device via the RFID readers.

6. The system of claim 5, wherein the sandbag information includes the number of available sandbags.

7. The system of claim 1, wherein the flood simulator application is configured to:
   determine an actual placement of a first plurality of sandbags deployed by the user;
   compare the actual placement to the determined optimal placement locations to identify one or more discrepancies; and
   in response to identifying the one or more discrepancies, automatically generate and display the avatar implementing additional sandbag placements to the current deployment of sandbags, the additional placements configured to guide the user in rectifying the one or more discrepancies.

8. A method for mitigating damage due to flooding comprising:

activating a virtual home application and a flood simulator application, wherein the virtual home application comprises a virtual map of a structure and of terrain adjoining the structure;

receiving forecasts of flooding events around the structure;

using the flood simulator application to automatically generate a virtual map of suggested sandbag placements around the structure based on an analysis of simulated floodwater flow;

displaying the virtual map of suggested sandbag placements on a screen of a computing device;

determining the actual placements of a plurality of sandbags comprising radio-frequency identification (RFID) tags based upon signals emitted by the RFID tags after the sandbags are physically placed around the structure;

receiving, from one or more water detectors positioned proximate to the plurality of sandbags and the RFID tags, water-detection signals indicating a presence of water;

correlating, by the computing device, the determined actual placements of the plurality of sandbags with the water-detection signals to identify a localized flood condition at a specific sandbag of the plurality of sandbags; and generating and displaying, on the screen of the computing device, an alert corresponding to the identified localized flood condition.

9. The method of claim 8, further comprising:
comparing, by the computing device, the actual placement to the suggested sandbag placements to identify one or more discrepancies.

10. The method of claim 9, further comprising:
in response to identifying the one or more discrepancies, automatically generating and displaying an avatar implementing additional sandbag placements to the current deployment of sandbags, the additional placements configured to guide a user in rectifying the one or more discrepancies.

11. The method of claim 8, wherein the RFID tags incorporate RFID chips in communication with the water detectors.

12. The method of claim 11, further comprising using image analysis on digital images from multiple cameras integrated into the virtual home application to confirm the results obtained using triangulation factor.

13. The method of claim 8, further comprising.

14. The method of claim 8, wherein using the flood simulator application to automatically generate a virtual map of suggested sandbag placements around the structure based on an analysis of simulated floodwater flow is performed automatically responsive to receiving sandbag information input by a user.

15. A system for mitigating damage due to flooding comprising:

a plurality of sandbags, each comprising an RFID tag;
a computing device comprising a virtual home application in communication with a flood simulation application;
a plurality of RFID readers in communication with the RFID tags and the computing device;
a plurality of water detectors in communication with the computing device;
wherein in the event of a forecasted flooding, the flood simulation application is configured to produce a virtual map which is displayed on a screen of the computing device, the virtual map showing suggested placements of the sandbags, as suggested by the flood simulation application;
wherein, after the sandbags have been deployed, the computing device is configured to determine the sandbags' actual placement based on signals received from the plurality of RFID readers;
wherein the computing device is also configured to:
  receive, from one or more water detectors positioned proximate to the plurality of sandbags and the RFID tags, water-detection signals indicating a presence of water;
  correlate, by the computing device, the determined actual placements of the plurality of sandbags with the water-detection signals to identify a localized flood condition at a specific sandbag of the plurality of sandbags; and
  generate and display, on the screen of the computing device, an alert corresponding to the identified localized flood condition.

16. The system of claim 15, wherein the computing device is configured to determine the actual placement of the sandbags using at least one of triangulation of RFID signals and image analysis.

17. The system of claim 16, wherein the computing device is configured to compare the actual placement of the sandbags to the suggested placement of the sandbags to identify one or more discrepancies.

18. The system of claim 17, wherein the computing device is configured to automatically generate and display an avatar implementing additional sandbag placements to the current deployment of sandbags, the additional placements configured to guide a user in rectifying the one or more discrepancies in response to identifying the one or more discrepancies.

19. The system of claim 15, wherein the RFID tags incorporate RFID chips in communication with the water detectors.

20. The system of claim 19, wherein the RFID tags are configured to notify the system that water has reached the water detector by executing at least one of pulsing their emitted RFID signals and emitting a separate notification signal.

* * * * *